United States Patent
Pavlov et al.

(10) Patent No.: US 6,509,118 B1
(45) Date of Patent: Jan. 21, 2003

(54) VALVE-REGULATED LEAD-ACID CELLS AND BATTERIES AND SEPARATORS USED IN SUCH CELLS AND BATTERIES

(76) Inventors: Detchko Pavlov, Fr. Joliot Curie Boulevard, 81B, Sofia 1113 (BG); Stefan Ivanov Ruevski, 24, Hristo Smirnenski Boulevard, Sofia 1421 (BG); Veselin Bozhidarov Naidenov, 240, Shipchenski Prohod Str., Entr. B, Sofia 1111 (BG); Vera Vladimirova Mircheva, 11, P. Parchevich Str., Sofia 1000 (BG); Galia Angelova Petkova, 6-12, Lozenska Planina Str., Entr. B, Sofia 1421 (BG); Mitko Kolev Dimitrov, 28, Georgi Sofiyski Str., Sofia 1606 (BG); Temelaki Vasilev Rogachev, 80, Hemus Str., Bl. 62, Entr. A., Sofia 1574 (BG); Mariana Hristova Cherneva-Vasileva, zh.k. Mladost-2, Bl 241, Entr. B, Sofia 1799 (BG)

( * ) Notice: Subject to any disclaimer, the term of this patent is extended or adjusted under 35 U.S.C. 154(b) by 0 days.

(21) Appl. No.: 09/423,026

(22) PCT Filed: Jul. 2, 1998

(86) PCT No.: PCT/US98/13649

§ 371 (c)(1),
(2), (4) Date: Oct. 28, 1999

(87) PCT Pub. No.: WO99/01902

PCT Pub. Date: Jan. 14, 1999

(30) Foreign Application Priority Data

Jul. 4, 1997 (BG) .............................................. 101753

(51) Int. Cl.$^7$ ................................................ H01M 4/56

(52) U.S. Cl. ........................ 429/225; 429/129; 429/142; 429/144; 429/247; 429/248; 429/249; 429/250; 429/251; 429/252; 429/253; 429/254

(58) Field of Search ................................. 429/225, 129, 429/142, 144, 247–254

(56) References Cited

U.S. PATENT DOCUMENTS

| | | | |
|---|---|---|---|
| 2,511,887 A | | 6/1950 | Vinal |
| 2,673,887 A | | 3/1954 | Booth |
| 4,529,677 A | | 7/1985 | Bodendorf |
| 5,075,183 A | | 12/1991 | Yamaguchi et al. |
| 5,478,677 A | * | 12/1995 | Choi et al. .................. 429/249 |
| 5,895,732 A | * | 4/1999 | Clough ........................ 429/204 |
| 6,120,939 A | * | 9/2000 | Whear et al. ................ 429/254 |

FOREIGN PATENT DOCUMENTS

| | | | |
|---|---|---|---|
| GB | 580390 | | 9/1946 |
| JP | 57065677 | * | 4/1982 ............ H01M/10/52 |
| JP | 3071554 | * | 3/1991 ............ H01M/2/16 |
| WO | WO 99/19922 | * | 10/1998 ............ H01M/2/16 |

* cited by examiner

*Primary Examiner*—Patrick Ryan
*Assistant Examiner*—Angela J Martin
(74) *Attorney, Agent, or Firm*—Morrison & Foerster LLP

(57) ABSTRACT

A valve-regulated lead-acid cell utilizes an absorptive glass mat separator having a glass fiber surface which is modified by treatment with at least one particular polymer, as by treatment with a polymer emulsion to coat at least part of the glass fiber surface and then sintering to dry the coating, the polymers including polyolefins, polytetrafluoroethylene, polyvinylchlorides, polyacrylonitriles, polyesters, amphiphilic block and graft copolymers, hydrophilic and amphiphilic nitrogen-containing polymers and polyorganosilica compounds such as polysilanes and polysiloxanes.

12 Claims, 2 Drawing Sheets

VALVE-REGULATED LEAD-ACID CELLS AND BATTERIES AND SEPARATORS USED IN SUCH CELLS AND BATTERIES

TECHNICAL FIELD OF THE INVENTION

The present invention relates to lead-acid cells and batteries, and, more particularly, to the separators used in valve-regulated lead-acid cells and batteries.

BACKGROUND OF THE INVENTION

Sealed lead-acid cells (often termed "VRLA" cells, viz., valve-regulated lead-acid) are widely used in commerce today. As is known, sealed lead-acid cells utilize highly absorbent separators, and the necessary electrolyte is absorbed in the separators and plates. Accordingly, such cells may be used in any attitude without electrolyte spillage as would occur with a flooded electrolyte lead-acid battery. Such cells are normally sealed from the atmosphere by a valve designed to regulate the internal pressure within the cell so as to provide what is termed an effective "oxygen recombination cycle" (hence, the use of the terms "sealed" and "valve-regulated")

The advantages that are provided by sealed lead-acid cells and batteries in comparison to conventional, flooded lead-acid electrolyte batteries are substantial and varied. Sealed lead-acid technology thus offers substantial benefits by eliminating maintenance (e.g., cell watering), expense (e.g., acid purchases), environmental concerns (e.g., expensive waste treatment systems and air-borne acid mist), and safety (e.g., acid burns).

It is thus not surprising that sealed lead-acid cells and batteries are widely used in commerce today for various applications that have widely differing requirements. In one type of application, generally termed as stationary applications, lead-acid cells and batteries are used, for example, for load leveling, emergency lighting and commercial buildings, as standby power for cable television systems, and in uninterruptible power supplies. The uninterruptible power supply may be used to back up electronic equipment, such as, for example, telecommunication and computer systems, and even as a backup energy source for entire manufacturing plants. When the principal power supply to the electronic equipment or the like has been cut off, such as during a power outage, the sealed cells (typically many electronically connected together) provide a source of reserve power to allow the telecommunication or computer system to remain operational until the principal power supply can be restored. The uninterruptible power supply also will accommodate short, or intermittent, losses in power, so that the function of the electronic equipment will not be impaired during a brief power outage.

In addition, there are many applications where sealed lead-acid cells and batteries are used in what are termed motive power applications. Sealed lead-acid cells and batteries are thus used as the power source for electric vehicles, fork-lift trucks, and the like.

The operation of VRLA cells and batteries is extremely complex and involves a variety of aspects. One important aspect is that VRLA cells must avoid conditions in service in which the temperature within the cell increases uncontrollably and irreversibly. It has thus been hypothesized that excessive water loss resulting in cell dry-out is the driving mechanism for thermal runaway in such cells. This water loss can be caused by hydrogen gassing at the negative electrode or oxygen gassing at the positive electrode through the electrolysis of water, or both.

As the water content and thus the cell saturation is reduced, the oxygen recombination efficiency increases uncontrollably. Since this recombination reaction is highly exothermic, this tends to heat the cell. As the temperature rises, the cell tends to generate gas; and the recombination processes become even more efficient, thereby further increasing the cell temperature. In similar fashion, water loss increases the cell electrical resistance; and such increased cell resistance increases the cell temperature, thereby further increasing water loss. The cell is in thermal runaway.

Despite thermal runaway being an ongoing issue which must be considered in designing VRLA cells and batteries, the impact of a particular separator design on this issue is not well understood. Indeed, the issue of thermal runaway has been dealt with in other ways, as by the selection of the alloys used for the positive grids in such cells and batteries.

Still further, a basic shortcoming of the separators typically used in VRLA cells and batteries is that, at higher battery temperatures (e.g., above about 50° C.), a decline in the mechanical and physico-chemical properties of the separators used has been observed. Such decline in properties leads to a decrease in efficiency of the closed oxygen cycle (viz., the oxygen recombination cycle) and to water loss, which shortens the active life of the cell or battery.

Additionally, a shortcoming of VRLA cells and batteries, in general, is that such cells and batteries have somewhat lower capacity, power and energy performance as compared to flooded electrolyte lead-acid cells and batteries. In an attempt to provide enhanced performance, commercial VRLA cells and batteries typically provide some means of compressing the cell or battery elements (viz., the positive and negative plates with the separators interposed therebetween) so as to maintain contact and thereby increase the battery capacity. Such compression, however, can lead to decline in the efficiency of the closed oxygen cycle, due to the reduced number and volume of the gas channels involved, which loss consequently can result in increased water loss.

Essentially from the inception of VRLA cells and batteries, the separators utilized have been highly absorptive glass mat separators. Such separators are usually, but not necessarily, thicker than the separators used in flooded electrolyte lead-acid cells and batteries and have substantially higher absorptivity. Such separators are often termed as "absorptive glass mats." Such absorptive glass mat separators are well known in this field, and several companies supply such separator materials.

Over the years, those working in this field have provided various proposals for modifying such absorptive glass mat separators in an attempt to overcome the difficulties of such absorptive glass mats. Thus, one proposal has been to include various amounts of polymer fibers into the glass mat, or to provide a polymer fiber layer introduced into the separator in some fashion. Another proposal involves thin paper pulp layers which are coated with layers of absorptive glass mats on both sides of the paper pulp layer. Other proposals have involved providing multiple layer separators (such as layers having different characteristics, e.g., surface area) and plastic separators filled with silica or the like so as to provide acid-gellifying separators.

To attempt to enhance the performance of VRLA cells and batteries, changes in other aspects of the cell and battery design, too numerous to mention, have been proposed. Nevertheless, currently available VRLA cells and batteries typically have lower cycle life and energy performance than is desired. Accordingly, despite the prior efforts in this field, a need exists for separators which can enhance the performance of such VRLA cells and batteries.

Accordingly, it is an object of the present invention to provide separator materials capable of achieving enhanced performance when used in VRLA cells and batteries.

Another and related object of this invention is to provide VRLA cells and batteries capable of achieving enhanced cycle life and energy performance characteristics.

Yet another object of the present invention is to provide facile methods for making such separators.

Other objects and advantages of the present invention can be seen from the following description of the invention.

BRIEF SUMMARY OF THE INVENTION

In general, the present invention is predicated on the discovery that VRLA cells and batteries having enhanced cycle life and electrical performance can be provided by utilizing absorptive glass mat separators modified by treatment with appropriate polymers. Suitable polymers comprise hydrophobic polymers such as polyolefins, polyvinylchlorides, polyacrylonitriles, and polyesters, amphiphilic copolymers, graft copolymers, and hydrophilic nitrogen-containing, water-soluble polymers. Desirably, surface active agents can be included.

It has been found that modification of the absorptive glass mat separators can be achieved by treating such separators with polymeric emulsions or dispersions of the selected polymer. While other types of emulsions can be used, it is desirable from an environmental standpoint to utilize aqueous polymeric emulsions.

It has been found that such modified absorptive glass mat separators impart enhanced mechanical properties and achieve improved electrical performance characteristics in VRLA cells and batteries. Providing such modified absorptive glass mat separators can thus be achieved in a facile fashion.

Moreover, by utilizing multiple separator layers, the individual layer can be treated so as to provide characteristics tailored more specifically to the location of the separator layer in VRLA cells and batteries. More specifically, as will be discussed in greater detail herein, it is desirable, in a preferred aspect of the present invention, to utilized double layer separators in which the relative hydrophilicity of the layers comprising the separator are different so as to enhance the efficiency of the closed oxygen cycle.

DESCRIPTION OF THE PREFERRED EMBODIMENTS

Figure 1:
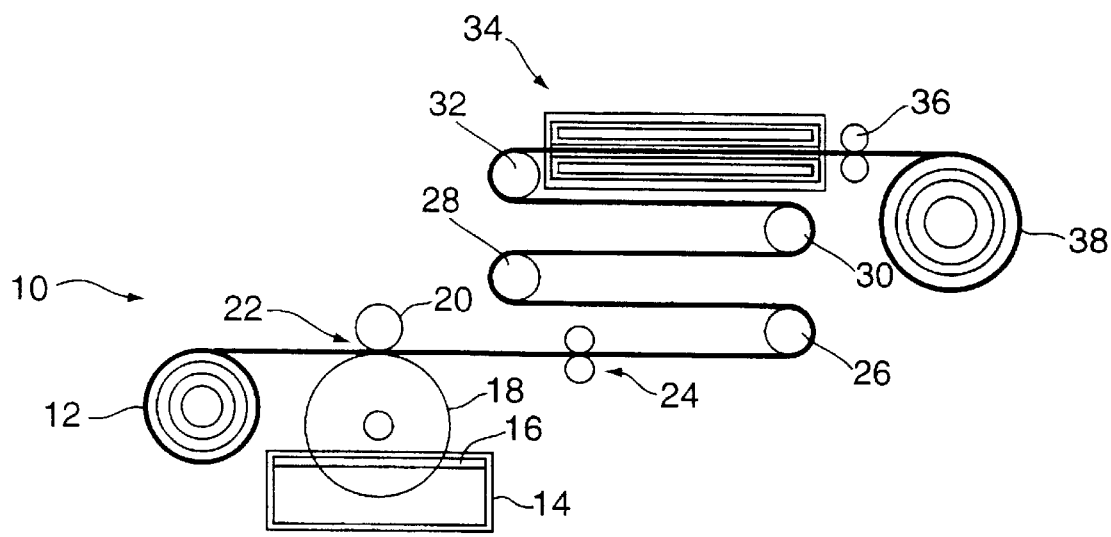
FIG. 1 is a schematic view of a process for making the modified absorptive glass mat separators.

FIG. 1 illustrates schematically one method for making the modified absorptive glass mat separators in conjunction with the present invention. Thus, the model conveyor-line scheme shown generally at 10 comprises first unrolling a roll 12 of the absorptive glass mat separator material. As used herein, the term "absorptive glass mat" comprises any such material useful for making separators for VRLA cells and batteries. A variety of such materials are known and are commercially available. Indeed, this terminology includes absorptive glass mat separators which incorporate a minor amount of polymer fibers, as is also known. Indeed, while not preferred, it should be appreciated that the modified separators of the present invention could include absorptive mats made predominantly from polymer fibers, and, indeed, made essentially with only polymer fibers, if such configurations are considered desirable for specific applications.

Pursuant to a preferred embodiment of the present invention, the absorptive glass mat is treated by applying a polymeric emulsion or dispersion of the selected polymer or polymers so as to coat the glass mat with the selected emulsion. As shown in FIG. 1, an emulsion bath 14 containing the polymer emulsion 16 is applied via rolls 18 and 20 to the absorptive glass mat 22.

It should be appreciated that the term "emulsion" as used herein is considered to also refer to what would literally be termed "dispersions." As regards this invention, what is preferred is that the polymer or polymers selected be capable of being applied by coating techniques, as can both polymer emulsions and dispersions. From an environmental standpoint, aqueous emulsions and dispersions are preferred. However, if desired, organic media can be employed.

Following the coating step, time is provided to allow absorption of the polymer emulsion into the absorptive glass mat 22. To this end, rolls 24, 26, 28 and 30 are spaced to allow travel of the coated, and thus-modified, absorptive glass mat for a time period sufficient to allow the emulsion to be adequately absorbed into the glass mat. The time involved will be somewhat dependent upon the rate of travel and the length of travel of the coated glass mat. Typical speeds allow absorption within no more than about several minutes, e.g., 5 minutes or so.

Finally, the thus-treated glass mat is subjected to a sintering step in which the emulsion is dried to fix the polymeric coating on the glass mat fibers. As shown, this step can be achieved by utilizing a conventional tunnel dryer. Thus, the absorptive glass mat 22 passes around roll 32 and enters tunnel dryer 34. Suitable drying and sintering will be dependent, of course, upon the length and time of travel in the tunnel dryer or other dryer utilized. It should be appropriate to achieve drying by a residence time of no more than several minutes, 5 to 10 minutes or so being satisfactory. The thus-sintered and dried absorptive glass mat can then be passed through rolls 36 and wound as a roll 38.

As may be appreciated, FIG. 1 is merely illustrative of one method by which the absorptive glass mat separators may be modified in accordance with the present invention. Thus, the absorptive mat could travel through an emulsion of the selected polymer or polymers. Similarly, the absorptive glass mat could be coated on both surfaces. Many other techniques are known and can be used. Thus, the particular method used for applying the selected polymer or polymers to the absorptive glass mat can be varied widely. Indeed, the polymers selected can be applied by means other than emulsions or dispersions, although the use of polymeric emulsions provide a ready and facile method for achieving the separators of the present invention.

More particularly, and while not wishing to be restricted to any particular theory, it is believed that applying the polymeric emulsion in the general method disclosed results in coating at least part of the glass fiber surface with a polymeric coating. Further, it is believed that the polymeric coating concentrates mainly at or adjacent to the sites of contact between the glass fibers. Thus, it is believed that the absorptive glass mat (characterized by adjacent, but unconnected, fibers) is thereby interconnected into what can be considered as a continuous network of fibers.

With regard to polymeric coating, suitable polymers are selected based upon the desired properties. In general, and as may be appreciated, suitable polymers should have satisfactory chemical resistance to the sulfuric acid electrolyte employed as well as being thermally stable at relatively high temperatures, e.g., 50° C. and higher. Still further, suitable polymers should be mechanically stable when bonded to the absorptive glass fiber mat. Thus, it has been found that particular polymers ranging from those having hydrophobic characteristics to hydrophilic polymers and polymers having both hydrophilic and hydrophobic properties can be utilized. As regards the hydrophobic polymers, it is preferred to utilize polyolefins and substituted polyolefins having the general formula:

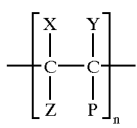

wherein n is an integer which is at least 50 and is less than 50,000. The substituents X, Y, Z, and P can be the same or different and may be fluorine, chlorine, hydrogen, an alkyl, aryl or alkyl-aryl radical. Suitable alkyls and aryl radicals can comprise any of the substituents used to modify polyolefins. Illustrative examples include: methyl, ethyl, propyl, benzyl, methylbenzyl, o-dimethylbenzyl, m-dimethylbenzyl, and p-dimethylbenzyl.

A particularly preferred hydrophobic polymer comprises a polytetrafluoroethylene aqueous emulsion. A preferred polytetrafluoroethylene emulsion or dispersion is available from Hoescht AG under the trade name Teflon 5032.

Other suitable hydrophobic polymers comprise various polyesters, polyvinylchlorides and polyacrylonitriles, many of which are known and are commercially available. Preferred polyesters include various polyalkylene terephthalates.

Other useful polymers include various amphiphilic block copolymers. Such copolymers include styrene and vinylpyrrolidone, styrene-ethylene oxide copolymers, multiblock copolymers of alkylene oxides or of alkylene and styrene oxides having the general formula:

$$[(A)_n\text{-}(B)_m]_x,$$

where n=10 to 100, m=15 to 40 and x=1 to 9; wherein A is a hydrophobic block corresponding to the above formula for hydrophobic polymers or poly(alkyleneoxides) (except polyethylene oxide), and B is a hydrophilic block comprising polyvinylpyrrolidone, polyacrylic acid, polyethylene oxide, polymaleic acid, or polystyrenesulfonic acid. A particularly preferred species is poly(N-vinylpyrrolidone-CO-styrene) (available as a 38% emulsion in water, Sigma-Aldrich Chemie GmbH).

Other useful graft copolymers having hydrophilic-hydrophobic compositions include:

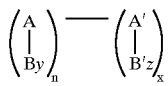

where x=0 to 100, y=5 to 20, 1<n<5, z=0 to 20; wherein A and A' are hydrophobic blocks as polydimethylsiloxane, polyvinylchloride, polystyrene, polypropylene, polyethylene, and the like, and B and B' are hydrophilic blocks as poly(ethylene oxide), poly(acrylic acid), poly(N-vinylpirrolidone), and the like.

Still further, useful polymers include nitrogen-containing, water-soluble polymers specifically poly(vinylpyrrolidone) polymers according to the following general formula:

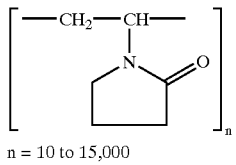

n = 10 to 15,000

Optionally, various surface active agents may be included in the emulsion used to enhance the wettability of the polymer onto the glass fibers and to improve the hydrophilicity of the glass fibers. Any of a variety of surface active agents are known and may be utilized. Illustrative examples include ethoxynonylphenol, alkylethersulfate or symmetric or asymmetric multi-block copolymers of alkylene oxides or multi-block copolymers of alkylene oxides and styrene oxide.

The amount of the polymer added to modify the absorptive glass mat separators can vary widely. In general, the amount utilized should be that sufficient to achieve the desired modification in properties. As an illustrative range, the amount of the polymer emulsion, or the polymer composition containing surfactants, can be from about 5 to about 50 grams per square meter of the absorptive glass mat.

The following set forth more preferred embodiments of polymeric emulsions to treat the absorptive glass fiber mats to provide the modified absorptive glass mat separators of the present invention:

Polytetrafluoroethylene Emulsions

A 60wt. % aqueous emulsion of polytetrafluoroethylene is utilized, the emulsion being diluted with water to provide a concentration of about 3.5 to 14 grams of polytetrafluoroethylene per one liter of emulsion. The emulsion is applied to the absorptive glass mat from one or both surfaces of the mat so as to provide a polytetrafluoroethylene level of between 5.5 to 22 milligrams per 1 gram of the treated glass fiber mat. The thus-impregnated absorptive glass mat is placed in a thermal chamber to air dry by evaporation of the contained water. The mat is then passed through a curing chamber heated to a temperature of 320 to 380° C. for a period of about 3 to 8 minutes. When treated on just one surface with emulsion, the resulting modified absorptive glass mat separators should be positioned in the cell with the treated surface preferably, but not necessarily, facing the negative plates.

A preferred surfactant comprises nonylphenol ethoxylated with 15 molecules of ethylene oxide, per the structure below:

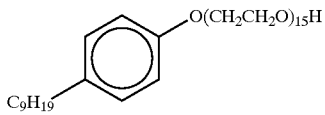

The surfactant is included in an amount of from about 1 to 2 grams per liter of the polytetrafluoroethylene emulsion. The obtained emulsion should then be stirred until fully homogenized. When used, the subsequent heating should be to a temperature of about 350° C.

A further useful and preferred surfactant comprises a symmetric block copolymer of ethylene and propylene oxides having the following chemical structure:

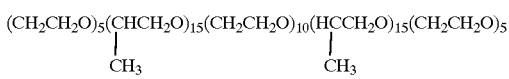

This copolymer may be added in an amount of about 1 gram per liter of the polytetrafluoroethylene emulsion.

A further preferred surfactant for a polytetrafluoroethylene emulsion is polyvinylpyrrolidone. A particularly preferred species is a polyvinylpyrrolidone having an average molecular weight near 360,000 (available from Sigma-Aldrich Chemie GmbH). This surfactant may be added in an amount of about 0.25 to 2.5 grams per one liter of the polytetrafluoroethylene emulsion. Preferably, the heating temperature utilized is 340° C.

Yet another preferred surfactant comprises a poly (dimethylsiloxane) graft polyacrylate (available as a 10% aqueous solution). Such surfactant may be added in an amount of about 1 gram per 1 liter of the 60% polytetrafluoroethylene emulsion.

A still further useful surfactant comprises an asymmetric block copolymer of ethylene and propylene oxides having the following formula:

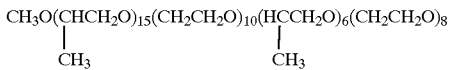

This surfactant may be added in an amount of 3 grams per 1 liter of the 60% polytetrafluoroethylene emulsion.

Polyvinylchloride Polymers

The absorptive glass mats, according to another preferred embodiment, can be treated with an aqueous dispersion of polyvinylchloride. A preferred and suitable surfactant added is a symmetric 5-block copolymer of ethylene oxide and propylene oxide as set forth above, having an average molecular weight of about 3000 and wherein the terminal blocks of the copolymer are polyethylene oxide. An illustrative dispersion can comprise, for example, 1.25 parts of a 60% polyvinylchloride dispersion containing 5 grams of the surface active agent per 1 liter of the dispersion, the dispersion being diluted with 1,000 parts of water. The thus-obtained, diluted dispersion can be applied to the glass mat on either one or both surfaces. Heating in a curing chamber can suitably be carried out at a temperature of from about 140° C. to about 180° C.

Polyethyleneterephthalate Emulsions

Similar to the procedure using a polyvinylchloride polymer dispersion, an aqueous emulsion or dispersion of polyethyleneterephthalate may be used. A preferred surfactant comprises alkylethersulfate. The procedures and the amounts utilized for polyvinylchloride can be the same for polyethyleneterephthalate. However, the temperature of heating should be about 240° C.

Polyacrylonitrile Polymers

According to another preferred embodiment, the absorptive glass mats can be modified through treatment with a 60% aqueous emulsion of polyacrylonitrile. A suitable surfactant comprises the asymmetric block copolymer of ethylene and propylene oxides discussed in conjunction with polytetrafluoroethylene emulsions. The temperature of heating should be in the range of about 180° to 200° C.

Styrene/Polyvinylpyrrolidone Copolymers

A still further preferred embodiment comprises an absorptive glass mat separator modified through treatment with a 38% aqueous emulsion of poly(N-vinylpyrrolidone-co-styrene). This emulsion may be diluted with water to provide a concentration of from about 0.05 to about 1 gram per 1 liter of emulsion. The emulsion may be applied to one or both surfaces of the glass mat so that the content of the dried polymer in the glass mat ranges from about 0.8 to about 8.0 milligrams polymer per 1 gram of the glass mat. After evaporation of the water, the modified separator may be heated to a temperature of about 200° to 210° C. for a period of about 3 to 10 minutes.

Figure 2:
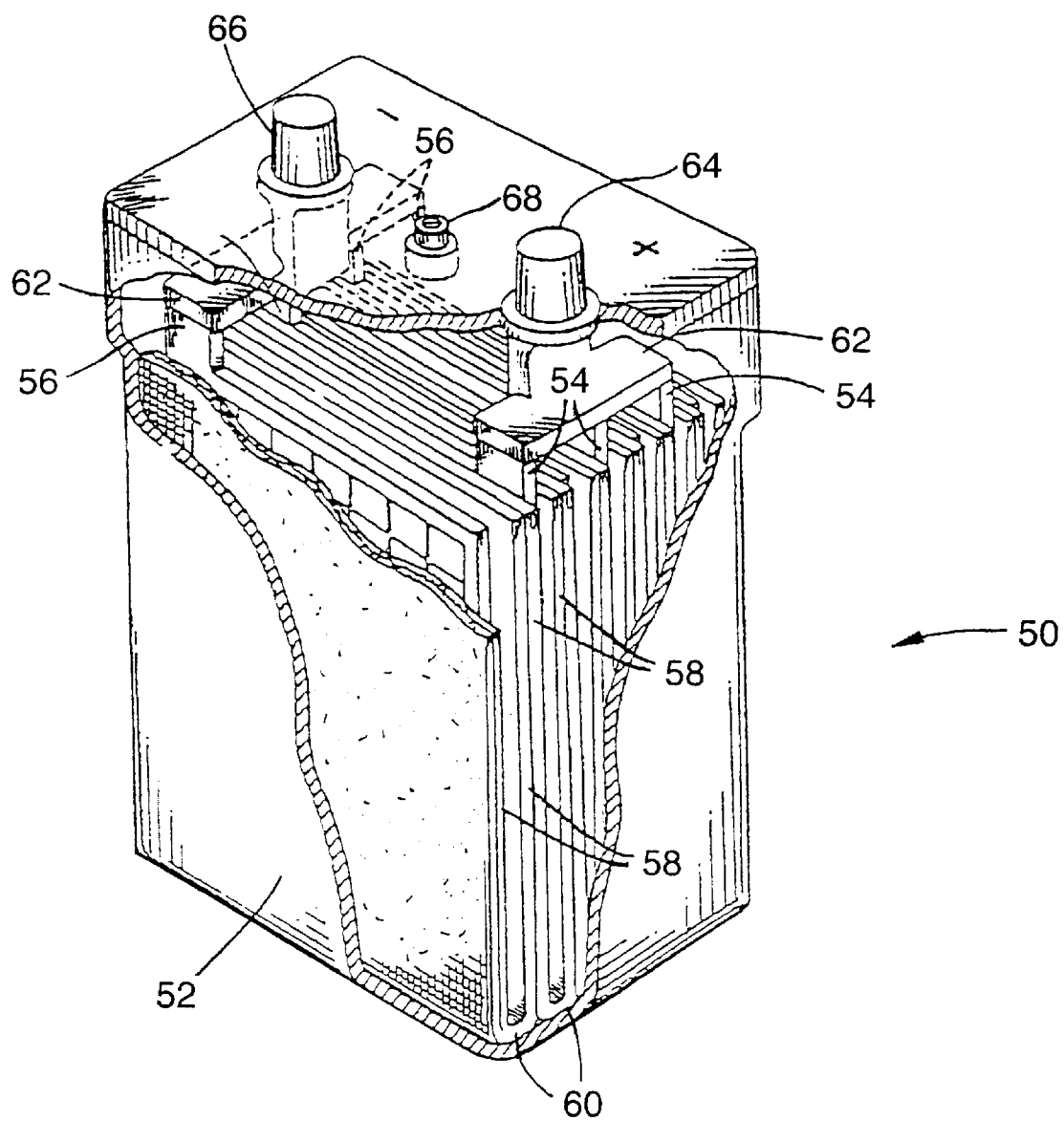
FIG. 2 is a perspective view of an exemplary VRLA cell with the container and cover partially broken away so as to show the internal configuration of the cell.

FIG. 2 illustrates a lead-acid cell in accordance with the present invention. The cell 50 has a container 52 containing a plurality of positive and negative plates, 54 and 56, respectively. As illustrated, the cell contains plural positive and negative plates. Of course, the cell can utilize the necessary number of plates to provide the capacity and other electrical performance characteristics desired for the particular application.

The plates 54, 56 are separated by absorbent separators 58. The separators comprise an absorptive glass mat modified in accordance with the present invention. In the preferred embodiment, the separator extends slightly past the electrode, to prevent an inadvertent short circuit of the cell. In addition, the separator may be folded around and between the plates by employing a U-fold 60, as illustrated in FIG. 2.

The separators 58 can suitably comprise either a single layer or two or more layers may be desired. One preferred embodiment comprises the use of a separator comprising two layers, each layer modified and positioned in the cell so as to enhance the performance of the cell. To this end, this preferred embodiment involves one separator layer having a greater level of hydrophilicity (as compared to that of the other layer) facing the positive plates, so as to enhance water availability. It is thus believed that, as the water is consumed for the formation of $PbO_2$ and $O_2$, a shortage of water may occur at the $PbO_2$/separator interface. Accordingly, positioning the relatively more hydrophilic separator layer toward the positive plate will enhance water availability at that interface, lessening the possibility of the cell drying out. The other separator layer having some degree of hydrophobicity can then be positioned so as to have its treated surface facing the negative plate.

The plates 54, 56 preferably fit snugly within the container 52, that is, the electrodes and separators should stay in the assembled condition when the container is inverted. Indeed, as is known, the cell configuration should insure that the plates and separators maintain adequate compression and good contact so as to enhance the electrical performance of the cell. Preferably, as illustrated in FIG. 2, the separators and plates are compressed so as to be in intimate contact with one another. The plates are connected to one another by conductive straps 62 and to external terminals 64, 66 by conventional means.

The thickness of the plates will vary depending upon the application to which the cell is intended. An illustration of a useful range is from about 0.030 inch to about 0.300 inch, but thinner or thicker plates may also be used. It is desired that the service life of the cell should be dictated by the thickness of the positive plates, as opposed to factors such as electrolyte or water loss or other modes of failure. If positive plate corrosion dictates the service life of the cell, the service life may be more readily predicted than for other modes of failure.

Preferably, the container is normally sealed from the atmosphere in use to provide an efficient oxygen recombination cycle as is known. The container should be able to withstand the pressure of the gases released during charging of the cell. Pressures inside the container may reach levels as high as, for example, 0.5–50 psig. Release venting is provided by a low pressure, a self-resealing relief valve, such as, for example, a bunsen valve 68. An example of such valve is illustrated in U.S. Pat. No. 4,401,730.

An electrolyte is also included within the container 52. Preferably, the electrolyte is absorbed within the separator and the positive and negative active material. The electrolyte typically is sulfuric acid having a specific gravity in the range of about 1.240 to about 1.340 or even more, as is considered appropriate for a particular application.

The illustrative VRLA cell shown in FIG. 2 is only exemplary. The particular design and configuration of the VRLA cells used can vary as desired. The specific configuration does not form a part of the present invention. Thus, the modified absorptive glass mat separators of this invention find utility in any VRLA cell or battery and may find utility in some flooded or conventional lead-acid battery designs.

As previously noted, it is believed that absorptive glass mat separators used in VRLA cells and batteries undergo partial degradation and that the mechanical and physicochemical properties decline in use in the presence and action of the sulfuric acid electrolyte and elevated temperatures. In part, the present invention is predicated upon the discovery that an appropriate selection of a polymer to treat or modify such absorptive glass mat fibers can result in what may be described as a continuous network of glass fibers in which the polymer residue plays the role, in effect, of welding, bonding, or gluing adjacent fibers together to provide a network. Indeed, by utilizing a diluted polymeric emulsion or dispersion, the polymer residue will concentrate in the sites of contact between the fibers as the solvent evaporates, under the action of capillary forces. Scanning electron micrographs of such modified absorptive glass fiber mats supports the conclusion that a continuous network of glass fibers is formed.

Further, absorptive glass fiber mats, when moistened with water and then dried, results in a significant decrease in the tensile strength of such separators. In contrast, modified absorptive glass mat separators according to the present invention have enhanced tensile strength when tested under similar conditions. The enhanced tensile strength is believed to beneficially effect the performance of VRLA cells and batteries under conditions of compression, as are typically used. Moreover, it is believed that the improved mechanical properties will prolong the useful cycle life and capacity of VRLA cells and batteries using the modified separators of the present invention.

Likewise, by a selection of the amount and type of the polymers utilized, the cycle life and other electrical performance characteristics of VRLA cells and batteries can be adjusted and enhanced. More particularly, utilizing polymers having some degree of hydrophobicity can form channels along which oxygen will move so as to improve the efficiency of the closed oxygen cycle. On the other hand, by providing a polymer coating having some degree of hydrophilicity, channels can be formed along which hydrogen ions and water may move so as to reduce the internal electrolytic resistance of the cell.

Thus, by appropriate selection of the characteristics of the polymer or polymers utilized, the effects upon the performance of the resulting VRLA cells and batteries can be modified. In addition, the modified separators of the present invention can improve the chemical and thermal stability to some extent, e.g., by about 5% to 14% or so. The rate of acidic electrolyte absorption in the various modified separators as well as the electrolyte's wicking rate into and through out a separator's pore network may vary somewhat. Thus, the relative rate of acidic electrolyte absorption as well as the wicking rate may be slightly lower than those rates for conventional separators, particularly with polymers having some degree of hydrophobicity. A lessened effect occurs with polymers wherein the surfactant and/or polymer has some degree of hydrophilicity. Indeed, and at any rate, the acid absorption and the wicking rates are considered quite satisfactory for use.

The following Examples are illustrative, but not in limitation, of the present invention. Commercial automotive plates (i.e., starting, lighting and ignition) were used for the test batteries. Only the positive plates were wrapped in a separator material. The capacity of the positive plates was calculated for a positive active material utilization coefficient of 45% and that of the negative plates for 41%. Unless otherwise indicated, the element for each cell comprised three positive and four negative plates.

The volume of sulfuric acid introduced into the cells was calculated from:

(a) the volume of electrolyte absorbed by the active materials of the plates, which was determined experimentally for the positive and negative plates;

(b) the volume of electrolyte absorbed by the separator. This volume was calculated taking into account the separator surface area enclosed between the plates and also the surface area of the separator outside the plates. While the whole volume of electrolyte enclosed between the plates conceptually takes part in the reactions, only about 60% of the electrolyte volume absorbed by that part of the separator that is outside the plates was assumed to be involved. The amount of sulfuric acid taking part in the reactions was calculated assuming that the sulfuric acid concentration decreased from 1.28 specific gravity to 1.10 specific gravity during discharge of the cell.

The separators used had a basis weight of 440 grams per square meter. The positive plates were assembled by wrapping with the separator material. Then, 60% of the calculated electrolyte volume was poured into the cell. Then, the plates and separators were inserted into the cell and left to absorb uniformly the whole amount of electrolyte. Next, the remaining 40% of the electrolyte volume was added.

The capacity of the positive and negative plates was about 30% higher than the capacity of the electrolyte. Accordingly, the electrolyte was the capacity limiting factor in each cell. In the test batteries, one of the cells was a control cell using an unmodified glass mat separator, and the other five cells utilized cell elements having various modified glass mat separators according to the present invention.

EXAMPLE 1

Cells with unmodified and modified absorptive glass mat separators were tested having different degrees of compression. The influence of the number of cycles on the capacity of the cells and the total amount of gas released from the cells during charge was determined.

Compression of the separator was obtained by inserting additional sheets of polypropylene having a thickness of 1 mm. The thickness of the element having a 20% compression (i.e., reduction of the separator thickness) was 35 mm. One and two polypropylene sheets were added to provide cells having the thickness reduced to 34 to 33 mm, respectively, which corresponds to 25% and 30% compression of the separators from their uncompressed thicknesses.

Only one side of the modified separators was coated with the hydrophobic polymer polytetrafluoroethylene using an aqueous emulsion "Teflon 5032," available from Hoescht AG. The commercial emulsion was diluted where 8.33 ml of the base emulsion was added to 1000 cc of water to provide a total volume of about 1008.3 ml. The quantity of the basic solids from the emulsion used per square centimeter of the separator was about 0.60 milligrams. Only one side of the separator was coated with the diluted hydrophobic polymer emulsion by the procedure as follows: The diluted emulsion was poured into a small shallow tray and a precut or presized piece of separator was placed in another larger area but still shallow tray. A transfer roller was dipped into the emulsion and the emulsion soaked into the transfer roller until it became saturated. The transfer roller was then removed from the small tray and then rolled over the separator sheet, on one side, effectively transferring a suitable amount of the diluted emulsion solution to the separator. The now wetted separator was allowed to stand for about 5 minutes to help distribute the fluid, and then the separator piece was placed into an oven and heated to about 340 degrees centigrade and held there for about 5 minutes. The separator was then removed from the oven and allowed to cool to room temperature. Several separator pieces were treated in this fashion and then incorporated into the appropriate cells.

Cells 1, 2 and 3 comprised an unmodified separator in which the thickness varied from the least compressed at 35 mm to 34 mm for cell 2 and to the most compressed at 33 mm for cell 3. Correspondingly, cells 4–6 had the same respective thicknesses as cells 1–3, each cell using modified absorptive glass separators as discussed herein.

The capacity in Ampere Hours versus the number of cycles was determined at a $C_5$ rate, each cycle being to 100% depth of discharge at 25° C. with intermediate testing at certain cycles at 50° C. What was found was that the cell with the modified separator and lowest level of separator compression (viz., a comparison of cell 1 with cell 4) provided increased capacity over the cycles tested when compared to cells using the unmodified separators at the lowest or highest levels of compression. Traditionally, lead-acid battery literature teaches that higher compression improves performance, but these results show that the modified separator did not degrade in performance at the low compression used. Inasmuch as higher compression levels and the higher pressures resulting were detrimental to long life and capacity, it is believed that greater productivity and/or lower material costs for the separators can be obtained utilizing the present invention.

Further, by determining the extent of the gas evolved, viewed as establishing the efficiency of the recombination (or the closed oxygen cycle), it was found, for each of the three cells utilizing the modified separators of the present invention, that the total gas evolved was substantially less. Thus, it is believed that the use of the present invention can achieve greater efficiency in recombination and improve cell operating life due to lower water loss rates.

EXAMPLE 2

This Example tests at various levels a hydrophobic polymer emulsion having various quantities of a hydrophilic surface active agent incorporated into the emulsion.

| Cell # | Side Facing Positive Plate | Side Facing Negative Plate |
|---|---|---|
| 1 | Unmodified Absorptive Glass Mat | Unmodified Absorptive Glass Mat |
| 2 | 1x1/20 F + 1 vp | 1x1/8 F + 0.5 vp |
| 3 | 1x1/20 F + 1 vp | 1x1/8 F + 1.0 vp |
| 4 | 1x1/20 F + 1 vp | 1x1/8 F + 1.5 vp |
| 5 | 1x1/20 F + 1 vp | 1x1/8 F + 2.0 vp |
| 6 | 1x1/20 F + 1 vp | 1x1/8 F + 2.5 vp |

The "F" relates to the polytetrafluoroethylene emulsion in Example 1 while the "vp" refers to the polyvinylpyrrolidone (viz., having a molecular weight of about 360,000, available from Sigma-Aldrich Chemie GmbH). As to the respective levels of each of these constituents, these were as follows: The separator sheet facing the positive plate was coated with a solution where 1 gram per liter of surfactant "vp" was added and stirred into the base emulsion "F", and then about 4.2 milliliters of this composite solution was added to 1000 cubic centimeters of water to make the final separator coating solution for the separator pieces that contact the positive plates. The low loading of the emulsion "F" makes the positive plate separator pieces less hydrophobic.

Depending on the test cell (i.e., #2–#6) the separator sheet facing the negative plate was coated with a solution where varying amounts of the surfactant "vp" was added and stirred into the base emulsion "F" at from 0.5 to 2.5 grams per liter, and then for each solution about 10.4 milliliters of each composite solution was diluted with 1000 cubic centimeters of water to make up the final coating solutions for the separator pieces that contact the negative plates. The higher loading of the emulsion "F" makes these separator pieces more hydrophobic than those facing the positive plates.

Both sheet types were prepared and processed as previously described. The cell construction used one sheet of each type located between each positive and negative plate in a cell element.

The battery was tested at an 80% depth of discharge. After every six cycles, the next cycle was conducted down to a 100% depth of discharge. The cell voltages were measured at the end of each discharge.

The results obtained indicate that the performance of the cells increased as the level of the hydrophilic surface active agent increased from the amount utilized in Cell 2 to that utilized in Cell 5. The performance in Cell 6, having a still higher level of the surface active agent, was diminished somewhat relative to that of Cell 5.

These results indicate that the desirable performance of the VRLA cells and batteries according to the present invention can be enhanced by appropriately adjusting the relative levels of the hydrophilic and hydrophobic constituents which are facing the respective plates. Thus, it is hypothesized that the incorporation of a surface active constituent facilitates the movement of oxygen gas and hydrogen ions from the positive to the negative plates, and the movement of water from the negative to the positive plates.

Thus, as has been seen, the present invention provides separators which can be utilized to provide VRLA cells and batteries having enhanced electrical performance. By appropriately selecting the polymer and other constituents utilized to modify a conventional absorptive glass mat separator, the capacity, cycle life and efficiency of the oxygen recombination cycle can be varied as desired for the particular application. While the present invention has been described

We claim:

1. A lead-acid cell having at least one absorptive glass mat separator modified by treatment with at least one polymer selected from the group consisting of polyolefins, polytetrefluoroethylene, polyvinylchlorides, polyacrylonitriles, polyesters, amphilic block and graft copolymers and hydrophilic and amphilic nitrogen-containing polymers, polyorgano-silica compounds, said polymer being present in an amount sufficient to enhance the tensile strength of the modified separator relative to that of the unmodified separator, said separator having two outwardly facing surfaces, wherein one of the outwardly facing surfaces has a higher hydrophilicity than the other outwardly facing surface.

2. The lead-acid cell of claim 1 wherein the polymer is a polyolefin or substituted polyolefin having the general formula:

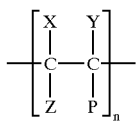

wherein n is an integer of from about 50 to about 50,000, and the X, Y, Z and P substituents are the same or different and are selected from the group consisting of fluorine, chlorine, hydrogen, alkyl, aryl, and alkyl-aryl.

3. The lead-acid cell of claim 2 wherein said polymer is a polytetrafluoroethylene and the modification comprises treatment of said glass mat with an aqueous polytetrafluoroethylene emulsion.

4. The lead-acid cell of claim 1 wherein said polymer is a water-soluble poly(vinylpyrrolidone) polymer according to the following formula:

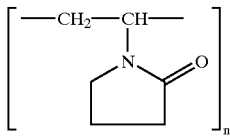

wherein n is an integer of from about 10 to about 15,000.

5. The lead-acid cell of claim 1 which includes an electrolyte and wherein said modified treatment includes treatment with a surface active agent present in an amount sufficient to enhance the wettability of said polymer to said glass mat and to improve the wettability of the separator by the electrolyte.

6. The lead-acid cell of claim 5 wherein said surface active agent is a member selected from the group consisting of ethoxynonylphenols, alkylethersulfates, symmetric or asymmetric multi-block copolymer of alkylene oxides and multi-block copolymers of alkylene oxides and styrene oxides.

7. The lead-acid cell of claim 1 wherein said cell is valve-regulated.

8. The lead-acid cell of claim 7 wherein said separator comprises at least two layers.

9. The lead-acid cell of claim 8 wherein said cell includes positive and negative plates and at least one of said separator layers has at least one surface modified with a polymer, the surface of the layer facing the positive plate having relatively more hydrophilicity than the surface of the layer facing the negative plate.

10. The lead-acid cell of claim 9 wherein at least the surface of said separator layer facing the negative plate is modified with a polymer having hydrophobic properties.

11. A lead-acid cell having at least one absorptive glass mat separator modified by treatment with at least one polymer selected from the group consisting of polyolefins, polytetrefluoroethylene, polyvinylchlorides, polyacrylonitriles, polyesters, amphilic block and graft copolymers and hydrophilic and amphilic nitrogen-containing polymers, polyorgano-silica compounds, said polymer coating at least part of the glass fiber surface and said polymer being present in an amount sufficient to enhance the tensile strength of the modified separator relative to that of the unmodified separator, said separator having two outwardly facing surfaces, wherein at least part of one of the outwardly facing surfaces has a higher hydrophilicity than the other outwardly facing surface.

12. The lead-acid cell of claim 1 wherein said glass mat has a glass fiber surface and said treatment includes treatment with a polymer emulsion and said polymer is present as a coating on at least part of the glass fiber surface.

* * * * *